United States Patent [19]

Hino

[11] Patent Number: 5,157,460
[45] Date of Patent: Oct. 20, 1992

[54] METHOD AND APPARATUS FOR MEASURING ROTARY SPEED USING POLARIZED LIGHT

[75] Inventor: Makoto Hino, Tokyo, Japan

[73] Assignee: Ricoh Company, Ltd., Tokyo, Japan

[21] Appl. No.: 540,125

[22] Filed: Jun. 19, 1990

[30] Foreign Application Priority Data

Jun. 20, 1989 [JP] Japan ................... 1-157137
Nov. 24, 1989 [JP] Japan ................... 1-305270
Feb. 19, 1990 [JP] Japan ................... 2-37725

[51] Int. Cl.$^5$ .................................... G01J 4/00
[52] U.S. Cl. ........................... 356/365; 250/225; 250/231.13
[58] Field of Search ............ 356/365, 364, 368, 436, 356/358, 29, 356, 385; 250/225, 231.13

[56] References Cited

U.S. PATENT DOCUMENTS 4,863,274 9/1989 Spillman et al. .................. 356/364

Primary Examiner—Samuel A. Turner
Assistant Examiner—La Charles P. Keesee
Attorney, Agent, or Firm—Oblon, Spivak, McClelland, Maier & Neustadt

[57] ABSTRACT

In a method and an apparatus for measuring a rotary speed of a rotary body, right and left circularly or elliptically polarized lights are incident to a polarizer attached onto a rotary face of the rotary body as a measured object. An optical beat signal is generated when the polarized lights are incident to the polarizer. This optical beat signal is detected a photodetector, etc. The rotary speed of the rotary body is calculated from a beat frequency of the optical beat signal. An optical rotator may be arranged on an optical path on which the right and left circularly polarized lights obtained through a ¼ wavelength plate are transmitted toward the polarizer. A corner-cube prism may be arranged between the rotary face and the polarizer to reflect the light beam transmitted through the polarizer toward the photodetector. The apparatus may have an optical member for totally reflecting the light beam reflected on the rotary face of the rotary body through the polarizer and guiding the totally reflected light beam to the photodetector.

9 Claims, 7 Drawing Sheets

METHOD AND APPARATUS FOR MEASURING ROTARY SPEED USING POLARIZED LIGHT

BACKGROUND OF THE INVENTION

1. Field of the Invention

The present invention relates to a method for measuring a rotary speed using light and applicable to the measurement of a rotary speed and an irregular rotation of a transfer drum in a copying machine and wow and flutter, etc. with respect to a drive motor for operating an optical disk, a polygon mirror, etc. The present invention also relates to a tachometer used to measure the rotary and irregular speeds of the transfer drum in the copying machine and wow and flutter, etc. of the drive motor for operating an optical disk, a polygon mirror, etc.

2. Description of the Related Art

As a method for measuring a speed using light, there are generally a correlation method, a lattice method and a laser Doppler method as shown in "Base of optically applied instrumentation" pp. 201 to 206, 1983 published by Japanese instrumentation automatic control society.

The laser Doppler method using a Doppler effect utilizes that a Doppler shift is caused with respect to a laser beam scattered by a moving particle. A most well-known laser Doppler method is of a differential type (a two-incident light method). A method for measuring an angular velocity of a rotary body is shown in Japanese Patent Application Laying Open (KOKAI) No. 63-222267.

An optical Doppler speed meter of the differential type needs a condition in which a movable object to be measured is located at an intersection point of two light beams. Therefore, when the movable object is vibrated or displaced in a direction shifted from a predetermined plane, it is difficult to measure the speed of the movable object. When the speed of the movable object having a coarse face is measured, the measured speed tends to have an influence of a speckle noise and the arrangement of a measuring means is restricted.

In the method for measuring an angular velocity, as shown in the above-mentioned Japanese laid-open publication, a circularly polarized light source having a frequency $\omega_1$ is attached to a rotary body and a circularly polarized light source having a frequency $\omega_2$ is disposed outside the rotary body to superimpose both circularly polarized lights on each other. When the angular velocity of the rotary body is set to $\omega'$, the frequency $\omega_1$ is shifted to $\omega_1 + \omega'$. Accordingly, the frequency $\omega'$ is calculated by detecting an optical beat signal showing $\omega_1 - \omega_2 \pm \omega'$ in a photodetector.

In the above angular velocity measuring method, a laser beam source must be attached to the rotary body to be measured. Therefore, this method is applicable to only a large-sized body since space for attaching the laser beam source to such a body can be secured. Further, it is necessary to use a laser very stably operated to generate two kinds of laser beams and beats. Such a laser is generally expensive and it is difficult to make the laser compact.

In the method for calculating the rotary speed of the rotary body, the beat signal is generated by attaching a small-sized polarizer to the rotary body and making right and left circularly polarized lights incident to the polarizer. In this method, when a laser beam source having single linearly polarized light is used, the right and left circularly polarized lights are provided by using a polarizing beam splitter and a ¼ wavelength plate and can be used to measure the rotary speed of the rotary body. However, in this case, a rotational direction of the rotary body cannot be judged from the beat signal. This is because, when the frequencies of the right and left circularly polarized lights are equal to each other, the obtained beat signal is proportional to $\{1 - \sin(2\omega_f t)\}$ so that the angular velocity is detected and calculated as an absolute value $|2\omega_f t|$ of a beat frequency $2\omega_f t$, thereby losing a sign of the angular velocity $\omega_f t$. Further, in this case, when the rotary speed is low, the beat frequency approaches zero so that it is difficult to discriminate this beat frequency from a frequency of a direct current component of light intensity and the accuracy in detection of the beat frequency is reduced.

SUMMARY OF THE INVENTION

It is therefore an object of the present invention to provide a method and an apparatus for measuring a rotary speed in which a means for measuring the rotary speed can be easily arranged and the rotary speed of a relatively small object can be also measured irrespective of a disturbance.

The above object of the present invention can be achieved by a method for measuring a rotary speed of a rotary body, comprising the steps of making right and left circularly or elliptically polarized lights incident to a polarizer attached onto a rotary face of the rotary body as a measured object; detecting an optical beat signal generated when the polarized lights are incident to the polarizer; and calculating the rotary speed of the rotary body from a beat frequency of the optical beat signal.

The above object of the present invention can be also achieved by a tachometer for measuring a rotary speed of a rotary body, comprising means for making right and left circularly or elliptically polarized lights incident to a polarizer attached onto a rotary face of the rotary body as a measured object; means for detecting an optical beat signal generated when the polarized lights are incident to the polarizer; and means for calculating the rotary speed of the rotary body from a beat frequency of the optical beat signal.

The above object of the present invention can be also achieved by a tachometer for measuring a rotary speed of a rotary body, comprising means for transmitting linearly polarized light emitted from a laser beam source through a ¼ wavelength plate to obtain right and left circularly polarized lights; means for making the right and left circularly polarized lights incident to a polarizer attached onto a rotary face of the rotary body; a photodetector for detecting an optical beat signal generated by the incidence of the right and left circularly polarized lights; means for calculating the rotary speed of the rotary body by a beat frequency of the beat signal; and an optical rotator arranged on an optical path on which the right and left circularly polarized lights obtained through the ¼ wavelength plate are transmitted toward the polarizer.

Accordingly, the beat frequency and a bias frequency can be included in the beat signal detected by making the right and left circularly polarized lights incident to the optical rotator. Thus, it is possible to measure an angular velocity and a rotational direction of the rotary body.

The above object of the present invention can be also achieved by a tachometer comprising a polarizer attached onto a rotary face of a rotary body; means for making right and left circularly polarized lights incident to the polarizer; a photodetector for detecting an optical beat signal generated by the incidence of the right and left circularly polarized lights; means for calculating the rotary speed of the rotary body by a beat frequency of the beat signal; and a corner-cube prism for reflecting the light beam transmitted through the polarizer toward the photodetector and arranged between the rotary face and the polarizer.

In this structure, an optical member for totally reflecting the light beam reflected on the rotary face of the rotary body through the polarizer and guiding the totally reflected light beam to the photodetector may be disposed instead of the corner-cube prism.

In accordance with the above construction of the present invention, the light beam transmitted through the polarizer is reflected by the corner-cube prism to separate the incident and reflected lights from each other, thereby guiding the reflected light to a photodetector. Therefore, it is possible to accurately measure the rotary speed of the rotary body without any influence of the change in reflectivity caused by the change in polarizing direction. Further, even when a face of the rotary body is vibrated, the position of the light beam transmitted to the photodetector is not changed so that it is easy to set the position of the optical system.

In accordance with the above structure of the present invention using the optical member, the light beam reflected on the rotary face of the rotary body through the polarizer is guided to the photodetector by the total reflection thereof by the optical member. In this case, even when the polarizing direction of the light beam is changed in accordance with the rotation of the polarizer, no quantity of light transmitted to the photodetector is changed so that it is possible to accurately measure the rotary speed of the rotary body.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of a method and an apparatus for measuring a rotary speed in the present invention will next be described in detail with reference to the accompanying drawings.

Figure 1:
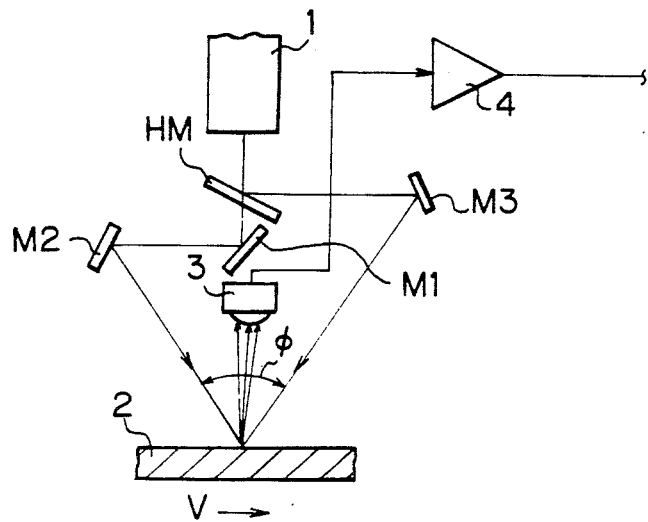
FIG. 1 is a view showing a general method for measuring a rotary speed.

FIG. 1 shows an example of an optical Doppler speed meter of a differential type. In this figure, light is emitted from a laser beam source 1 and is divided into two lights by a half mirror HM. One of the divided lights is transmitted to a movable object 2 to be measured through mirrors M1 and M2. The other of the divided lights is transmitted to the movable object 2 through a mirror M3. It is assumed that the movable object 2 is moved at a speed V in the direction of an arrow in FIG. 1. After the above lights have reached the movable object 2, lights reflected from the movable object 2 are detected by a photodetector 3. A detecting signal from the photodetector 3 is then amplified and processed by an amplifier 4 to calculate the speed V of the movable object 2.

The above optical Doppler speed meter of the differential type needs a condition in which the movable object to be measured is located at an intersection point of two light beams. Therefore, when the movable object is vibrated or displaced in a direction shifted from a predetermined plane, it is difficult to measure the speed of the movable object. When the speed of the movable object having a coarse face is measured, the measured speed tends to have an influence of a speckle noise and the arrangement of a measuring means is restricted.

Figure 2:
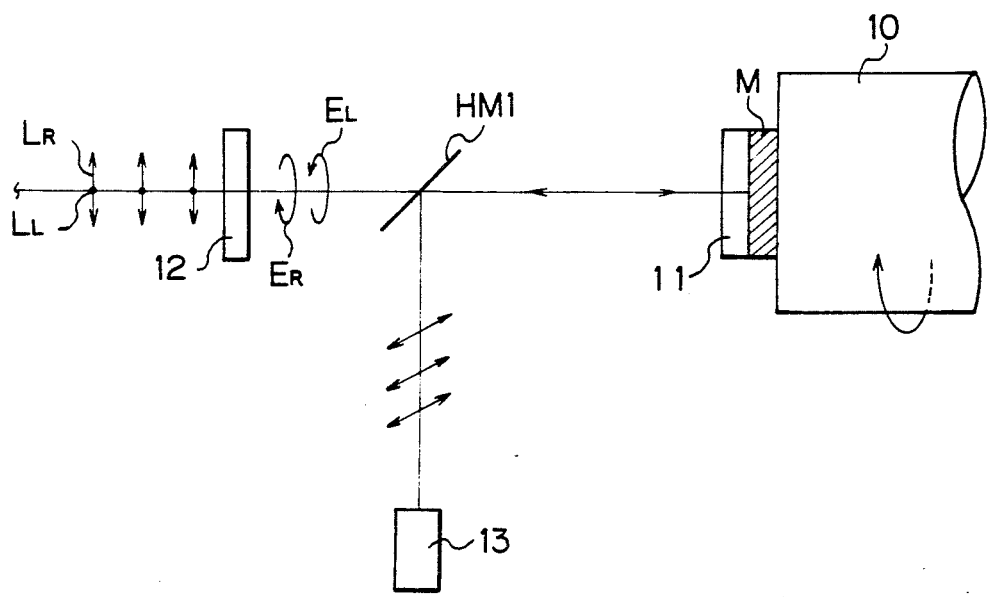
FIGS. 2 to 5 are views showing a method for measuring a rotary speed in a first embodiment of the present invention.

FIG. 2 shows a method and an apparatus for measuring a rotary speed in a first embodiment of the present invention. In this figure, a polarizer 11 is attached onto an end face of a rotary body 10 to be measured through a mirror M. An unillustrated laser beam source, etc. are arranged in front of this polarizer 11. A ¼ wavelength plate 12 and a half mirror HM1 are sequentially arranged between the laser beam source and the polarizer 11. A photodetector 13 is arranged on an optical path branched by the half mirror HM1. First, linearly polarized lights perpendicular to each other are incident to the ¼ wavelength plate 12. This ¼ wavelength plate 12 is arranged such that a phase advancing axis of a crystal is inclined at angle 45° with respect to the respective linearly polarized lights. A light beam transmitted through the ¼ wavelength plate 12 is composed of right and left circularly polarized lights $E_R$ and $E_L$. This light beam is then incident to the polarizer 11 attached to the rotary body 10 rotating on a plane of polarization with respect to the circularly polarized lights. The right and left circularly polarized lights are converted by the polarizer 11 to linearly polarized lights $L_R$ and $L_L$ vibrating in the same direction and are reflected on a mirror M disposed on a rear face of the polarizer 11.

The above reflected lights are guided to the photodetector 13 through the half mirror HM1 arranged on an optical path without any conversion by the polarizer 11. For example, when the polarizer 11 is at rest, the right and left circularly polarized lights are transmitted through the polarizer 11 and become coherent and show a certain intensity. When the polarizer 11 is rotated at an angular velocity $\omega_f$, a frequency shift is caused with respect to the right and left circularly polarized lights so that an optical beat signal is detected. The above-mentioned contents will next be described by using a Jones Matrix.

The right and left circularly polarized lights $E_R$ and $E_L$ are represented by the following formulas (1) and (2).

$$E_R = \frac{E_0}{\sqrt{2}} \begin{pmatrix} 1 \\ i \end{pmatrix} \exp(-i\omega t) \quad (1)$$

$$E_L = \frac{E_0}{\sqrt{2}} \begin{pmatrix} i \\ 1 \end{pmatrix} \exp(-i\omega t) \quad (2)$$

The polarizer rotating at the angular velocity $\omega_f$ is represented by the following formula (3).

$$\begin{pmatrix} \cos^2 \omega_f t & \frac{1}{2} \sin 2\omega_f t \\ \frac{1}{2} \sin 2\omega_f t & \sin^2 \omega_f t \end{pmatrix} \quad (3)$$

When the right and left circularly polarized lights are incident to the rotating polarizer, the formulas (1) and (2) are respectively changed to the following formulas (4) and (5) by the action of the formula (3).

$$E_R = \frac{E_0}{\sqrt{2}} \begin{pmatrix} \cos^2 \omega_f t & \frac{1}{2} \sin 2\omega_f t \\ \frac{1}{2} \sin 2\omega_f t & \sin^2 \omega_f t \end{pmatrix} \begin{pmatrix} 1 \\ i \end{pmatrix} \exp(-i\omega t) \quad (4)$$

$$E_L = \frac{E_0}{\sqrt{2}} \begin{pmatrix} \cos^2 \omega_f t & \frac{1}{2} \sin 2\omega_f t \\ \frac{1}{2} \sin 2\omega_f t & \sin^2 \omega_f t \end{pmatrix} \begin{pmatrix} i \\ 1 \end{pmatrix} \exp(-i\omega t) \quad (5)$$

In the above formulas, reference numeral $E_0$ designates an amplitude.

When the respective circularly polarized lights in the formulas (4) and (5) are interfered with each other, light intensity is calculated by $I = |E_R + E_L|^2$. Thus, the light intensity $I = I_0\{1 + \sin(2\omega_f t)\}$ is obtained. In this case, $I_0$ is equal to $E_0^2$ and designates a direct current component of the light intensity I. Accordingly, the rotary speed $\omega_f t$ is calculated irrespective of the absolute values of I and $I_0$ by measuring a change in time of the light intensity I.

In the above formulas, the coherent lights are modulated in intensity at a frequency twice the angular velocity, thereby generating an optical beat signal. Such contents mean that a frequency shift $\pm \omega_f t$ is caused by the rotation of the polarizer with respect to the right and left circularly polarized lights and a beat signal having frequency $2\omega_f t$ corresponding to the difference in frequency between the right and left circularly polarized lights is caused by the interference therebetween. Namely, the optical beat signal is generated by only the difference in frequency between the circularly polarized lights. Thus, the rotary speed of the object is calculated by detecting the generated beat frequency. The right and left circularly polarized lights are transmitted on the same optical path so that a stable signal can be obtained without any influence of a change in phase of an intermediate optical system, etc.

Figure 3:
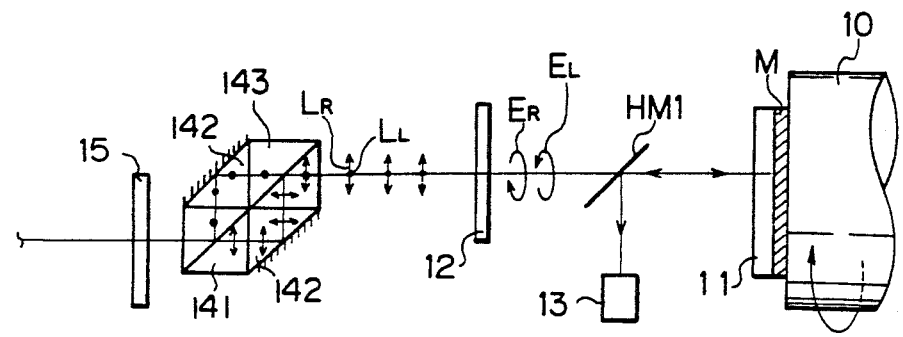

The light source having the linearly polarized lights as shown in FIG. 2 is commercially sold as a laser of a transverse Zeeman type. However, such a laser is generally expensive and similar effects can be obtained by using another laser cheaply manufactured and oscillating only single linearly polarized light. FIG. 3 shows an example of the construction of such a laser.

In FIG. 3, reference numerals 141, 142, 143 and 15 respectively designate a polarizing beam splitter, rectangular prism, beam splitter and a ½ wavelength plate. The ½ wavelength plate 15 is disposed to rotate a vibrational direction of linearly polarized light emitted from a light source such that ratios of quantity of lights separated by the polarizing beam splitter 14 are equal to each other. It is possible to increase a S/N ratio of a generated beat signal by setting the light quantity ratios to be equal to each other.

The linearly polarized lights perpendicular to each other can be also obtained by using a birefringent polarizing element such as a Savart plate, a Wollaston prism, etc. instead of the above polarizing beam splitter 14.

Figure 4:
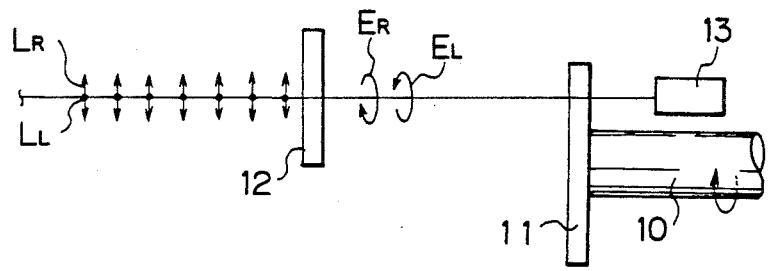

In FIG. 4, the size of a polarizer 11 attached to a rotary body 10 is set to be larger than that of the rotary body 10 and a photodetector 13 is arranged through the polarizer 11 in a position opposite to a ¼ wavelength plate 12. In such a structure, an optical beat signal can be detected without using the mirror M for reflecting light and the half mirror HM1 for guiding light to the photodetector 13 in FIGS. 2 and 3. In this structure, the number of parts is reduced and it is very easy to adjust the operation of the optical system.

Figure 5:
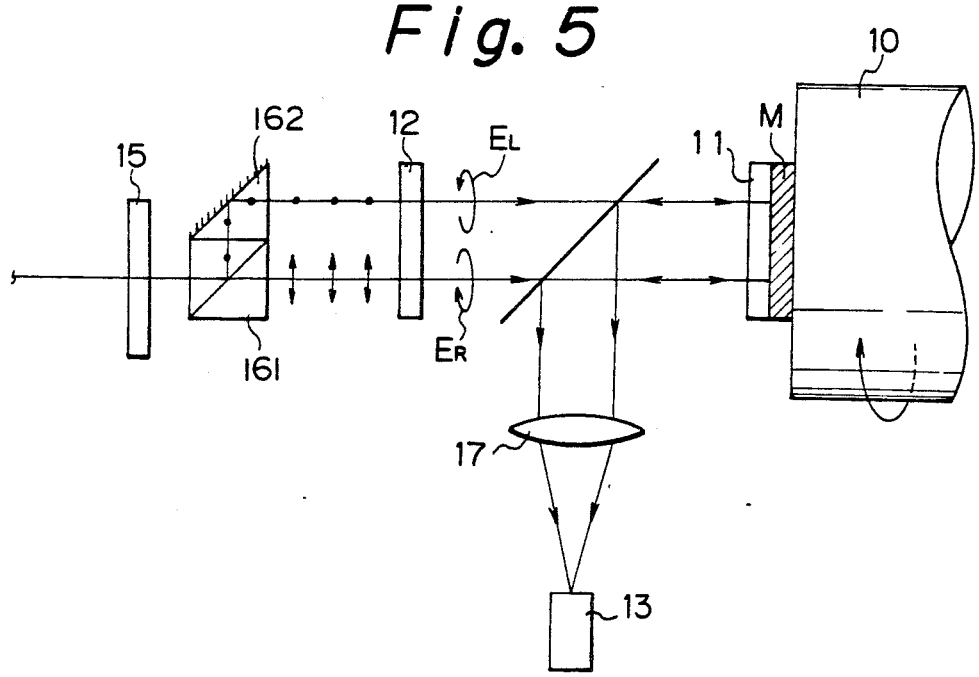

In FIG. 5, similar to the construction of FIG. 3, linearly polarized lights perpendicular to each other are obtained by a polarizing beam splitter 161, and a rectangular prism 162. After the separation of the linearly polarized lights perpendicular to each other, these lights are converted by a ¼ wavelength plate 12 to right and left circularly polarized lights without overlapping the separated polarized lights with each other. The right and left circularly polarized lights are then incident to a rotating polarizer 11 and lights reflected from the polarizer 11 are converged by a lens 17 so as to interfere them with each other. In this structure, the two lights separated by the polarizing beam splitter 16 are spatially in proximity to each other and are transmitted through the same optical element, thereby providing a stable signal.

A light source for providing the right and left circularly polarized lights can be constructed by an LD of an externally oscillating type. When such a constructional element is used, it is possible to make the entire structure compact.

It is sufficient for the polarizer attached to the rotary body to have a size for reflecting or transmitting a light beam therethrough. The size of the polarizer can be sufficiently reduced when a thin light beam is used. Accordingly, it is possible to measure a rotary speed without giving any influence to the rotation of a small-sized rotary body.

Further, since a signal is detected by directly detecting the reflected or transmitted light, signal intensity can be increased and no speckle noise is caused, thereby measuring the rotary speed at a high S/N ratio.

The optical system can be constructed by a common path optical system so that it is possible to stably measure the rotary speed without any influence of a disturbance. Further, it is possible to measure the rotary speed without any influence of external displacement and vibration of the rotary object in a direction shifted from a predetermined plane.

In the present invention, elliptically polarized lights may be used instead of the circularly polarized lights.

Figure 6:
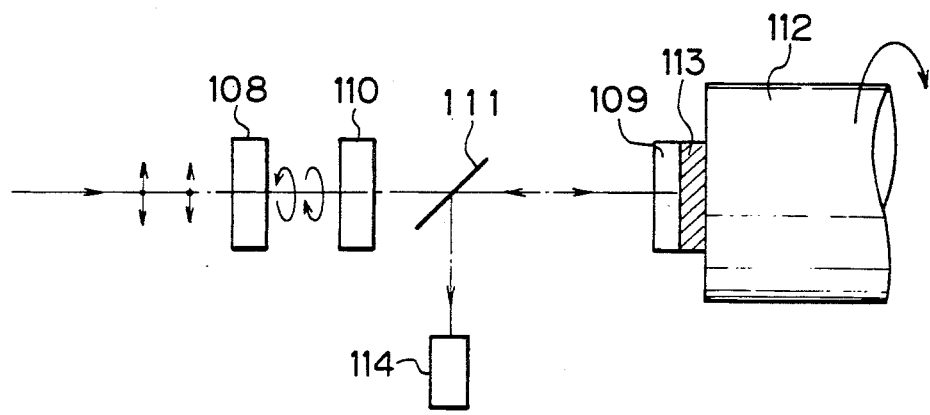
FIG. 6 is a view showing the construction of a tachometer in a second embodiment of the present invention.

A tachometer in a second embodiment of the present invention will next be described in detail with reference to FIGS. 6 to 8. In FIG. 6 showing the construction of the tachometer in the second embodiment of the present invention, right and left circularly polarized lights are transmitted through a ¼ wavelength plate 108 to a polarizer 109. An optical rotator 110 is disposed on an optical path of the right and left circularly polarized lights between the ¼ wavelength plate 108 and the polarizer 109 and constructs a main portion of the tachometer in this second embodiment of the present invention. This optical rotator 110 can be constructed by using a plane parallel plate cut in a direction perpendicular to an optical axis (Z axis) of quartz crystal, a Faraday rotor, etc.

It is assumed that linearly polarized lights perpendicular to each other are incident to the ¼ wavelength plate 108. This ¼ wavelength plate 108 is arranged such that a phase advancing axis of a crystal is inclined at angle 45° with respect to the respective linearly polarized lights. The lights transmitted through the ¼ wavelength plate 108 are separated into right and left circularly polarized lights and are then incident to the optical rotator 110.

Before a light beam is incident to the optical rotator 110, an angular velocity of the light beam is set to $\omega_0$ and an azimuth angle of the optical rotator 110 is set to $\theta$. In this case, an angular velocity $\omega_1$ of the right circularly polarized light is provided by $\omega_1 t = \omega_0 t + \theta$. Similarly, an angular velocity $\omega_2$ of the left circularly polarized light is provided by $\omega_2 t = \omega_0 t \times \theta$. Accordingly, the angular velocities are different from each other in accordance with the rotating directions of the polarized lights. The right and left circularly polarized lights are thus emitted from the optical rotator 110 in a state in which their angular velocities are different from each other. The right and left circularly polarized lights are then transmitted through a half mirror 111 and are incident to the polarizer 109 attached to a rotary body 112 to be measured with respect to the rotary speed thereof. Linearly polarized light is translated from the right and left circularly polarized lights is then reflected on a mirror 113 arranged on a rear face of the polarizer 109. Thereafter, the linearly polarized light is then reflected on a mirror 111 and are detected by a photodetector 114. In this case, light intensity I to be detected can be represented as follows.

$$I = I_0 (1 - \sin(\Delta \omega t + 2\omega_f t))$$

where $I_0$ designates a direct current component of the light intensity and $\omega_f$ designates an angular velocity of the rotary body and $\Delta\omega = \omega_1 - \omega_2$.

Accordingly, the light intensity I is modulated at a frequency provided by adding a bias frequency $\Delta\omega t$ to a frequency twice the angular velocity $\omega_f$ of the rotary body 112. This light intensity shows that a beat signal is generated. Namely, a beat frequency is detected and the angular velocity of the rotary body is half an absolute value of a frequency provided by subtracting the bias frequency $\Delta\omega t$ from the beat frequency. At this time, a sign of this angular velocity of the rotary body shows a rotary direction.

As mentioned above, the emitted linearly polarized laser beam is incident to the ¼ wavelength plate 108 and is set to the right and left circularly polarized lights. The right and left circularly polarized lights are guided to the optical rotator 110 and are then incident to the rotating polarizer 109, thereby detecting the beat signal generated at this time. Thus, it is possible to provide the angular velocity and rotary direction of the rotary body.

Figure 7:
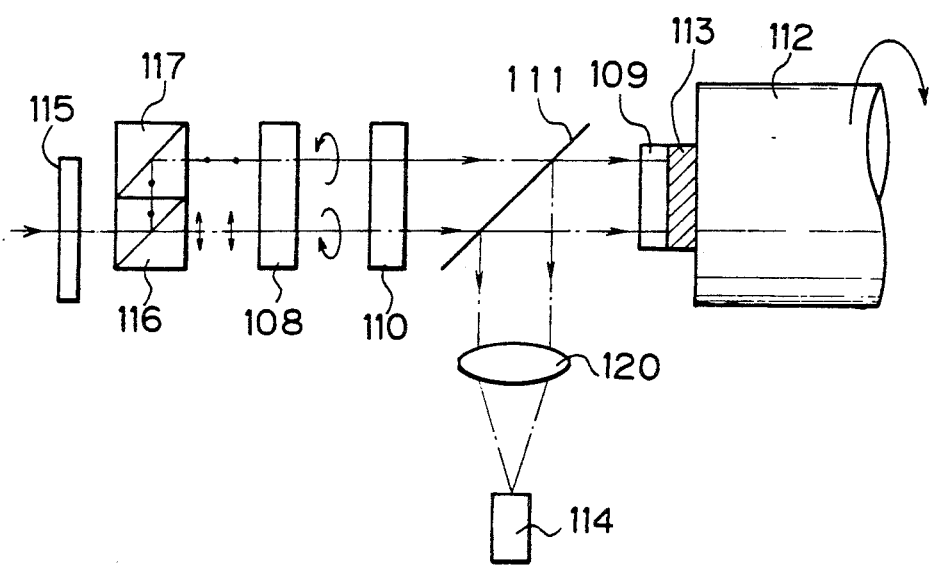
FIG. 7 is a view showing the construction of the tachometer including a light emitting system.
Figure 8:
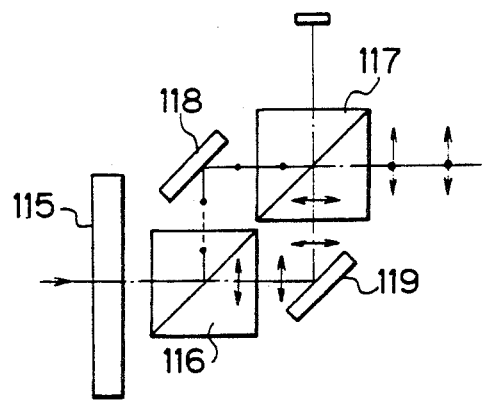
FIG. 8 is a view showing an example of the construction of this light emitting system in FIG. 7.

FIG. 8 shows an example of a light emitting system in which the linearly polarized lights perpendicular to each other are changed to light beams on the same optical axis by using an unillustrated laser beam source oscillating only linearly polarized light. In this case, a laser beam is guided to a ¼ wavelength plate 115 and is then transmitted through an optical system constructed by combining polarizing beam splitter 116, beam splitter 117 with mirrors 118, 119. Thus, it is possible to obtain the linearly polarized lights perpendicular to each other. The tachometer shown in FIG. 7 can be constructed by combining the light emitting system in FIG. 8 with the above-mentioned optical system of the tachometer in FIG. 6.

In this case, similar to FIG. 8, the light emitting system in FIG. 7 is constructed to obtain the linearly polarized lights perpendicular to each other by the polarizing beam splitter 116 and beam splitter 117. After the separation of the linearly polarized lights perpendicular to each other, these lights are converted by the ¼ wavelength plate 108 to right and left circularly polarized lights without overlapping the linearly polarized lights with each other. The right and left circularly polarized lights are then transmitted through the optical rotator 110 and are then incident to the rotating polarizer 109 so that lights reflected from a mirror 113 are converged and interfered with each other by a condenser lens 120. In this case, the separated two light beams are spatially in proximity to each other and are transmitted through the same optical element so that a stable signal can be detected.

The ¼ wavelength plates 115 in FIGS. 7 and 8 are used to rotate a vibrational direction of the linearly polarized light emitted from the laser beam source such that the ratios of quantity of lights separated by the polarizing beam splitters 116 is equal to each other. An S/N ratio of a generated beat signal can be increased by making the ratios of quantity of lights equal to each other. Further, the linearly polarized lights perpendicular to each other can be obtained by using an unillustrated birefringent polarizing element such as a Savart plate, a Wollaston prism, etc. instead of the polarizing beam splitters 116.

Figure 9:
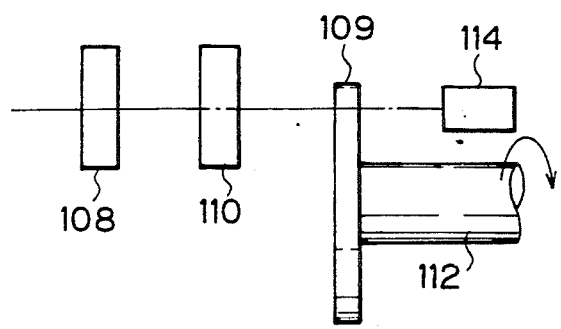
FIG. 9 is a view showing the construction of a tachometer in a modified embodiment of the present invention.

A tachometer in a modified embodiment of the present invention will next be described with reference to FIG. 9. In this embodiment, a polarizer 109 attached to a rotary body 112 is constructed to be larger in size than the rotary body 112. Thus, as shown in FIG. 6, the beat signal can be detected without using the mirror 113 for reflecting a light beam and the half mirror 111 for guiding the light beam to the photodetector 114. Therefore, the number of parts and space can be reduced so that the operation of the entire optical system can be very simply adjusted.

In the second embodiment of the present invention, the right and left circularly polarized lights are obtained by transmitting the linearly polarized lights emitted from the laser beam source through the ¼ wavelength plate. The right and left circularly polarized lights are then incident to the polarizer attached onto a rotary face of the rotary body, thereby generating and detecting an optical beat signal by the photodetector. In the light tachometer, the rotary speed of the rotary body is calculated by a beat frequency of this beat signal. In this tachometer, an optical rotator is disposed on an optical path on which the right and left circularly polarized lights obtained through the above ¼ wavelength plate are transmitted toward the above polarizer. Accordingly, the beat frequency and a bias frequency can be included in the beat signal detected by making the right and left circularly polarized lights incident to the optical rotator. Thus, it is possible to measure an angular velocity and a rotational direction of the rotary body. Further, even when the rotary frequency is very small, it is possible to measure the angular velocity and rotational direction of the rotary body with high accuracy by detecting the beat signal discriminated from a direct current component of the light intensity.

Figure 10:
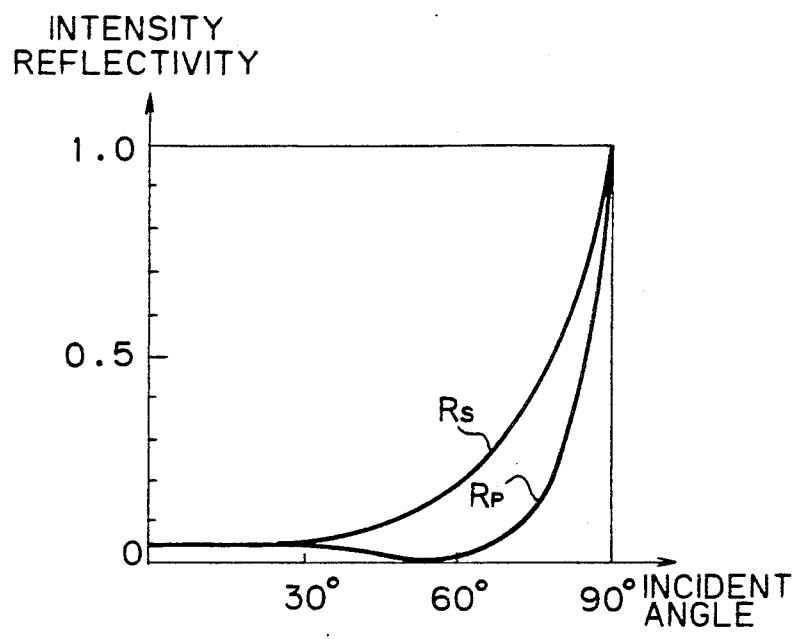
FIG. 10 is a graph showing characteristic curves of an intensity reflectivity with respect to an incident angle.

In the tachometer shown in FIG. 6, when a face of the rotary body 112 is vibrated, the light beam reflected on the mirror 113 attached to the rotary body 112 is transmitted in the shape of an arc. Therefore, an angle of the reflected light beam incident to the half mirror 111 and a reflection angle of this incident light beam are periodically changed. Further, the light beam transmitted to the half mirror 111 is linearly polarized and a polarizing direction thereof is changed in accordance with the rotation of the rotary body 112. When the polarizing direction of the incident light beam and the incident angle thereof are periodically changed, there is a difference in reflectivity between S and P polarized lights as shown in FIG. 10 in which the axis of abscissa shows the incident angle and the axis of ordinate shows the intensity reflectivity, thereby periodically changing the intensity of the reflected light. In FIG. 10, reference numberals $R_S$ and $R_P$ respectively designate the intensity reflectivities of the S and P polarized lights. FIG. 10 shows the intensity reflectivity with respect to the incident angle when the light beam is incident to glass (refractive index 1.5) from air (refractive index 1.0). Accordingly, in the structure shown in FIG. 6, the intensity of the light beam reflected on the half mirror 111 is modulated at a frequency twice the rotary speed of the rotary body. Therefore, a signal detected by the photodetector 114 is provided by superimposing such a modulated signal on a beat signal given by the rotation of the rotary body 112. Accordingly, there is a possibility that an error in measurement of the rotary speed is caused.

Figure 11:
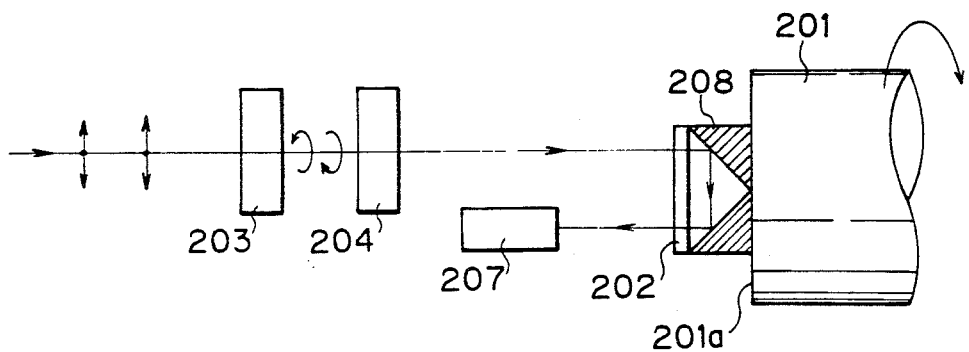
FIG. 11 is a side view showing a tachometer in a third embodiment of the present invention.

A tachometer in a third embodiment of the present invention will next be described in detail with reference to FIG. 11. In this embodiment, a corner-cube prism 208 is disposed instead of the mirror 113 in FIG. 6. A light beam is linearly polarized through a polarizer 202 and is transmitted toward and reflected from a photodetector 207 disposed on an axis different from the axis of an optical rotator 204.

In such a structure, even when a face of a rotary body 201 is vibrated, the light beam is reflected by the corner-cube prism 208 and is accurately reflected in a direction parallel to the incident direction. This reflected light is separated from the incident light by the reflection thereof on the corner-cube prism 208. Accordingly, the reflected light can be directly guided to the photodetector 207 without a half mirror, etc. Therefore, no periodic noise caused by the vibration of the face of the rotary body is superimposed on a beat signal detected by the photodetector 207 so that the rotary speed of the rotary body can be accurately measured.

Figure 12:
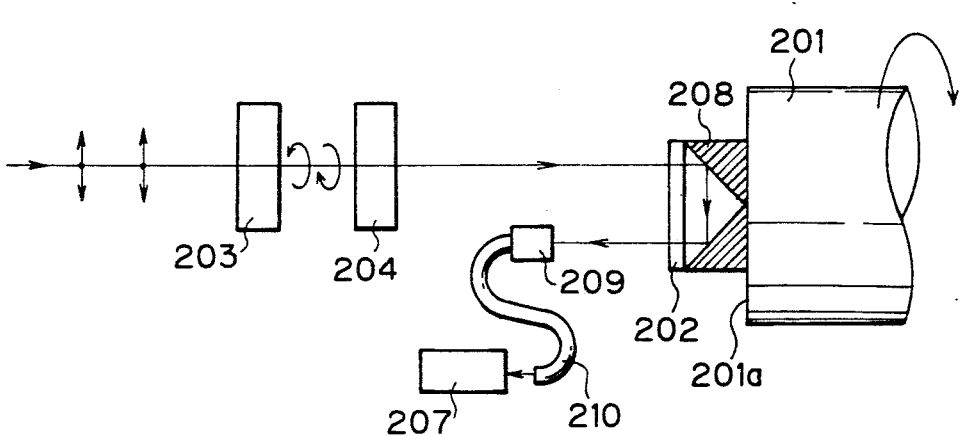
-FIG. 12 is a side view showing a tachometer in a fourth embodiment of the present invention.

FIG. 12 shows a tachometer in a fourth embodiment of the present invention. In this embodiment, a light beam reflected on the corner-cube prism 208 is guided to the photodetector 207 through a SELFOC lens 209 and an optical fiber 210. In this embodiment, when the size of the corner-cube prism 208 is reduced to reduce a load with respect to the rotary body 201, it is efficient to provide a degree of freedom with respect to layout when there is not enough distance between the incident and reflected lights to arrange the photodetector 207.

Figure 13:
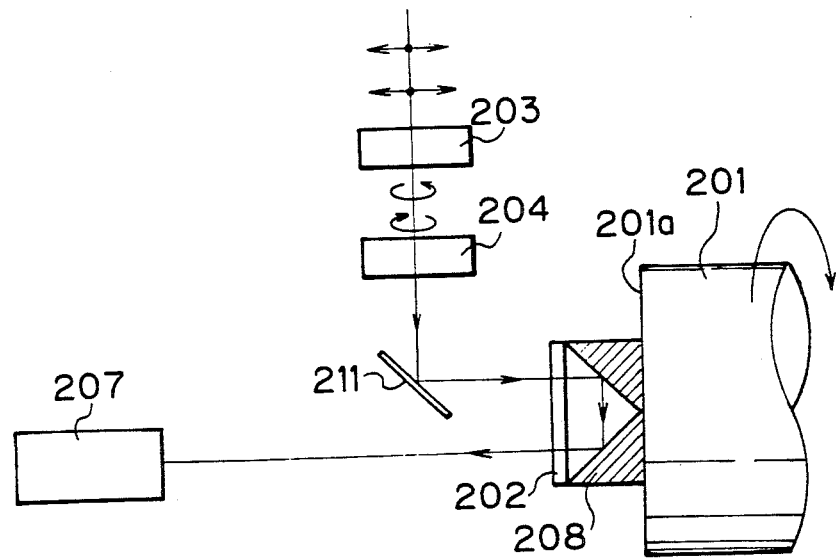
FIG. 13 is a side view showing a tachometer in a fifth embodiment of the present invention.

FIG. 13 shows a tachometer in a fifth embodiment of the present invention. In this embodiment, similar to the fifth embodiment, an incident light beam is reflected on a mirror 211 when a ¼ wavelength plate 203, an optical rotator 204, etc. cannot be arranged in parallel to each other.

Figure 14:
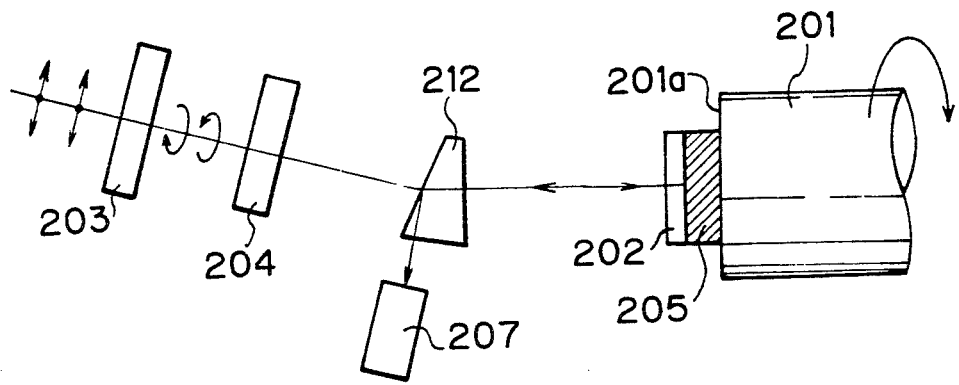
FIG. 14 is a side view showing a tachometer in a sixth embodiment of the present invention.
Figure 15:
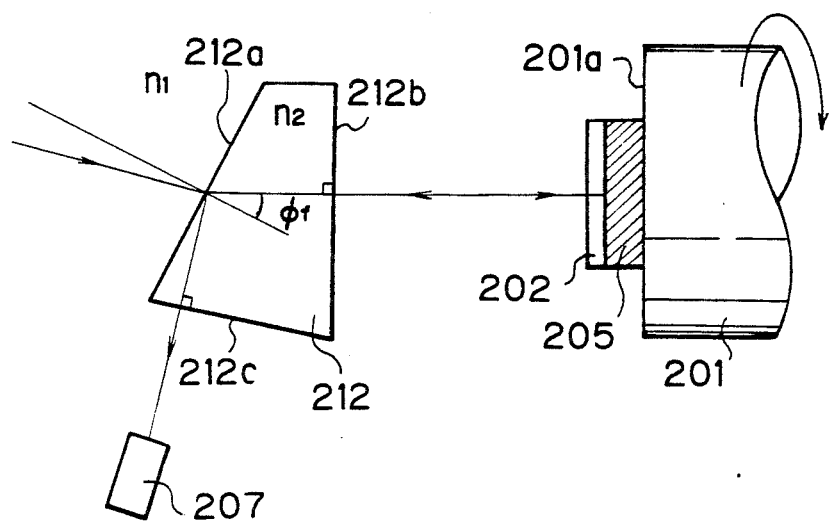
FIG. 15 is a partially enlarged side view of the tachometer in FIG. 14.

FIGS. 14 and 15 show a tachometer in a sixth embodiment of the present invention. In this embodiment, a total reflection prism 212 as an optical member is disposed instead of the half mirror 111 in FIG. 6. This total reflection prism 212 is arranged on an optical path between the optical rotator 204 and the polarizer 202. The light reflected from the polarizer 202 is totally reflected by the total reflection prism 212 and is separated from the incident light and is guided to the photodetector 207.

In such a structure, the light beam reflected on the mirror 205 through the polarizer 202 is guided by the total reflection prism 212 to the photodetector 207 so that there is no change in reflectivity in accordance with the polarizing direction, thereby causing no superimposition of a periodic change in quantity of light.

The total reflection prism 212 will next be described in detail with reference to FIG. 15. When the refractive index of air is set to $n_1 (=1.0)$ and the refractive index of the prism 212 is set to $n_2 (=1.5)$, a critical angle $\phi_c$ causing the total reflection is provided by the following formula.

$$\phi_c = \sin^{-1}(n_1/n_2) \approx 41.8°.$$

Accordingly, the light beam transmitted from the side of the optical rotator 204 is incident to the total reflection prism 212 so as to be refracted at an angle $\phi_f (> \phi_c)$ on a face 212a of the total reflection prism 212. A face 212b of the total reflection prism 212 is set to be perpendicular to the optical axis of the polarizer 202. In this state, the light beam transmitted through the total reflection prism 212 is reflected by the rotary body 201 (the mirror 205) through the polarizer 202 and is again incident onto the face 212b in a state in which this light beam is perpendicular to the face 212b. This light beam is then incident onto the face 212a at an angle equal to or greater than the critical angle $\phi_c$. Thus, the light beam is totally reflected on the face 212a within the prism 212 and is transmitted on the side of a face 212c. This face 212c of the prism 212 is set to be perpendicular to the light beam totally reflected on the face 212a. The light beam emitted from this face 212c is guided to the photodetector 207 and is detected by this photodetector.

In accordance with the above construction of the total reflection prism 212, the light beam is totally reflected by this prism on the face 212a thereof irrespective of the polarizing direction of the light beam, and the incident angles of the light beam with respect to the faces 212b and 212c are zero. Accordingly, the transmittance of the light beam does not depend on the polarizing direction thereof. Therefore, no error in measurement of the rotary speed of the rotary body is caused when the half mirror 206 is used, etc.

The incident angle of the light beam reflected by the rotary body 201 with respect to the face 212b of the total reflection prism 212 and the emitting angle of the light beam with respect to the face 212c are not necessarily set to be 0° accurately. Namely, these angles may be set to angles causing no difference in intensity reflectivity between the S and P polarized lights in the characteristics thereof shown in FIG. 10. For example, these angles may be set to an angle less than 20° in the case of the characteristics of the S and P polarized lights in FIG. 10.

Figure 16:
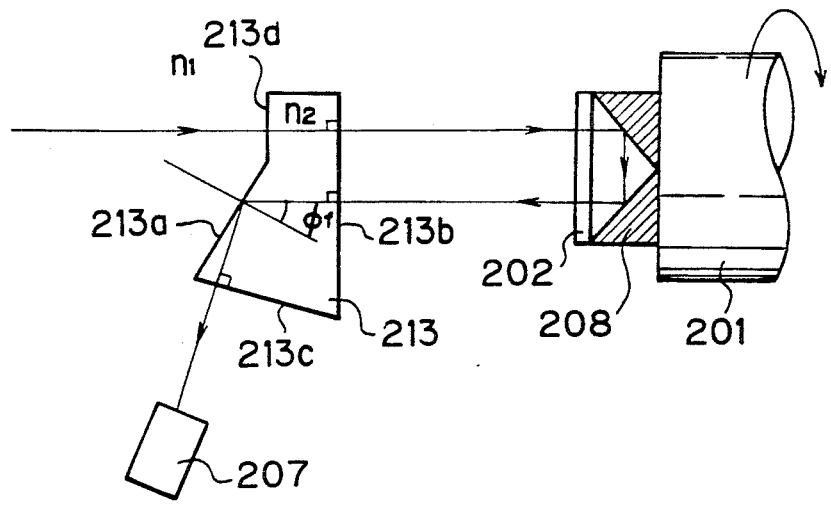
FIG. 16 is a side view showing a tachometer in a seventh embodiment of the present invention.

FIG. 16 shows a tachometer in a seventh embodiment of the present invention. In this embodiment, a corner-cube prism 208 and a total reflection prism 213 as an optical member are combined with each other so as to easily arrange the total reflection prism 213. The total reflection prism 213 has a pentagonal shape including faces 213a, 213b and 213c corresponding to the faces 212a, 212b and 212c of the total reflection prism 212 in the above-mentioned embodiment in FIG. 14 and a face 213d perpendicular to the light beam toward the polarizer 202 from the optical rotator 204.

As mentioned above, in accordance with the third to fifth embodiments of the present invention, the light beam transmitted through the polarizer is reflected by the corner-cube prism to separate the incident and reflected lights from each other, thereby guiding the reflected light to a photodetector. Therefore, it is possible to accurately measure the rotary speed of the rotary body without any influence of the change in reflectivity caused by the change in polarizing direction. Further, even when a face of the rotary body is vibrated, the position of the light beam transmitted to the photodetector is not changed so that it is easy to set the position of the optical system. In accordance with the sixth and seventh embodiments of the present invention, the light beam reflected on a rotary face of the rotary body through the polarizer is guided to the photodetector by the total reflection thereof by an optical member. Accordingly, even when the polarizing direction of the light beam is changed in accordance with the rotation of the polarizer, no quantity of light transmitted to the photodetector is changed so that it is possible to accurately measure the rotary speed of the rotary body.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for measuring a rotary speed of a rotary body, comprising the steps of:
    emitting a first linearly polarized light by a laser beam source;
    transmitting the first linearly polarized light through a ¼ wavelength plate so as to change the linearly polarized light into right and left circularly polarized lights or right and left elliptically polarized lights;
    transmitting the circularly or elliptically polarized lights through a polarizer attached onto a rotary face of the rotary body so as to change the circularly or elliptically polarized lights into second linearly polarized lights;
    reflecting the second linearly polarized lights;
    receiving the reflected second linearly polarized lights so as to detect an optical beat signal generated by a difference in frequency between the circularly polarized lights or the elliptically polarized lights; and
    calculating the rotary speed of the rotary body from a beat frequency of the optical beat signal.

2. A method according to claim 1, further comprising a step of transmitting the circularly or elliptically polarized lights through an optical rotator so as to change angular velocities of the circularly or elliptically polarized lights in accordance with rotating directions of the circularly or elliptically polarized lights, thereby to give a bias frequency to the optical beat signal.

3. A method according to claim 1, wherein the step of reflecting comprises reflecting the second linearly polarized lights by a corner-cube prism so as to separate the reflected second linearly polarized lights from the second linearly polarized lights with respect to an optical path.

4. A method according to claim 1, further comprising a step of reflecting totally the reflected second linearly polarized lights by an optical member.

5. A tachometer for measuring a rotary speed of a rotary body, comprising:
    a laser beam soure for emitting a first linearly polarized light;
    a ¼ wavelength plate for changing the emitted linearly polarized light into right and left circularly polarized lights or right and left elliptically polarized lights;
    a polarizer attached onto a rotary face of the rotary body for changing the circularly or elliptically polarized lights into second linearly polarized lights;
    reflecting means disposed between the polarizer and the rotary face of the rotary body for reflecting the second linearly polarized lights;
    a photodetector for receiving the reflected second linearly polarized lights so as to detect an optical beat signal generated by a difference in frequency between the circularly polarized lights or between the elliptically polarized lights; and
    a calculating means for calculating the rotary speed of the rotary body from a beat frequency of the optical beat signal.

6. A tachometer according to claim 5, further comprising an optical rotator arranged on an optical path between the ¼ wavelength plate and the polarizer for changing angular velocities of the circularly or elliptically polarized lights in accordance with rotating directions of the circularly or elliptically polarized lights, and for giving a bias frequency to the optical beat signal.

7. A tachometer according to claim 5, wherein the reflecting means comprises a mirror.

8. A tachometer according to claim 5, wherein the reflecting means comprises a corner-cube prism for reflecting the second linearly polarized lights so as to separate the reflected second linearly polarized lights from the second linearly polarized light with respect to an optical path.

9. A tachometer according to claim 8, further comprising an optical member arranged on an optical path between the polarizer and the photodetector for reflecting totally the reflected second linearly polarized lights.

* * * * *